(12) United States Patent
Teng

(10) Patent No.: US 7,997,296 B2
(45) Date of Patent: Aug. 16, 2011

(54) AIR VALVE DEVICE

(75) Inventor: Ming Teng, Taipei (TW)

(73) Assignee: Swo-Chung Chai, Taipei (TW)

( * ) Notice: Subject to any disclaimer, the term of this patent is extended or adjusted under 35 U.S.C. 154(b) by 481 days.

(21) Appl. No.: 12/285,910

(22) Filed: Oct. 16, 2008

(65) Prior Publication Data
US 2010/0096024 A1    Apr. 22, 2010

(51) Int. Cl.
*F16K 15/20* (2006.01)
(52) U.S. Cl. .................. 137/226; 137/493.9; 137/512.1; 251/82; 5/706
(58) Field of Classification Search .............. 251/82, 251/341, 343, 345, 346, 347, 83; 137/599.08, 137/599, 599.01, 599.16, 599.18, 601.2, 137/601.21, 614.13, 614.18, 861, 516.11, 137/516.25, 516.27, 493.9, 223, 226, 230, 137/493, 269.5, 512.1; 5/706
See application file for complete search history.

(56) References Cited

U.S. PATENT DOCUMENTS

| | | | | |
|---|---|---|---|---|
| 5,871,031 | A * | 2/1999 | Greinacher | 137/599.08 |
| 6,622,749 | B2 * | 9/2003 | Li | 137/223 |
| 7,275,494 | B2 * | 10/2007 | Polley et al. | 137/223 |
| 7,438,081 | B1 * | 10/2008 | Chen | 137/226 |
| 7,640,945 | B2 * | 1/2010 | Lin | 137/269.5 |
| 7,757,704 | B2 * | 7/2010 | Lien | 137/269.5 |

* cited by examiner

*Primary Examiner* — John K Fristoe, Jr.
*Assistant Examiner* — Andrew J Rost
(74) *Attorney, Agent, or Firm* — Rosenberg, Klein & Lee

(57) ABSTRACT

An outdoor lighting device includes a housing, at least one power supply device and at least one arrayed lighting unit. The housing has a surface forming at least one reflection zone and the reflection zone includes a lens. The power supply device is arranged inside the housing and has a grounding terminal connected to the housing. The power supply device receives and converts an alternate current power into an output of direct current power. The arrayed lighting unit includes plural arrays of lighting elements and a light-transmitting protection layer. The arrayed lighting unit is arranged inside the housing at a location corresponding to the lens and is connected to the power supply device, whereby the power supply device provides the arrayed lighting unit with the direct current power to energize the arrayed lighting unit to give off light that is reflected by the reflection zone. As such, an outdoor lighting device containing therein an arrayed lighting unit and an internal built-in power supply device is formed.

7 Claims, 9 Drawing Sheets

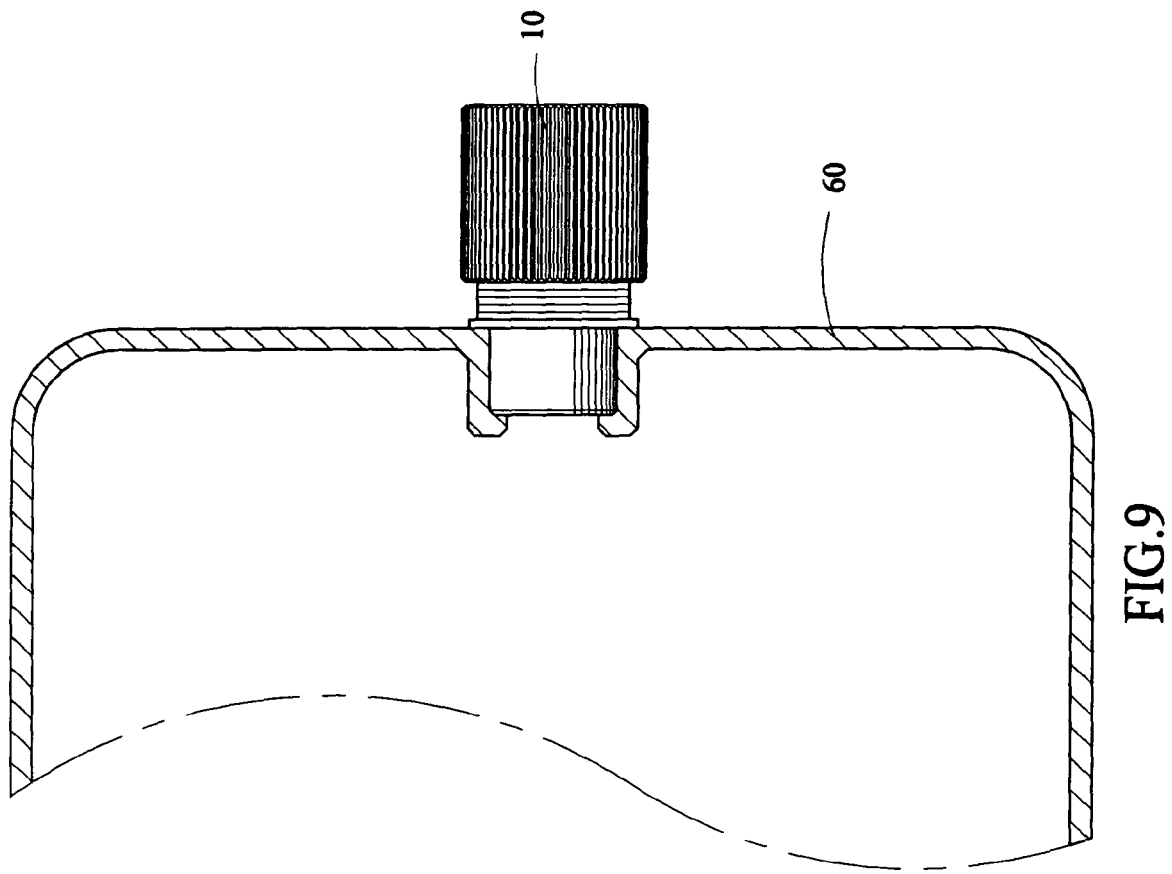

AIR VALVE DEVICE

BACKGROUND OF THE INVENTION

1. Field of the Invention

The present invention relates to an air valve device, and in particular to an air valve device that is comprised of a cap, an insert, a slidable rod, and a main body, wherein rotating to move the cap to different locations with respect to the main body sets the insert and slidable rod at different locations inside the main body to realize an air-tight sealing condition, a deflation-allowed and inflation-prohibited condition, and an inflation-allowed and deflation-prohibited condition of the air valve device.

2. The Related Arts

A conventional air valve device is mounted to an inflatable article or object, such as an inflatable mattress and an inflatable toy and is often of a basic design including an air inlet opening in which a valve that operable to seal the air inlet opening or be manually driven away to open the air inlet opening. When the internal pressure of the inflatable object exceeds the external pressure, the internal pressure forces the valve to block the air inlet opening to thereby realize an air-tight sealing or alternatively, the valve can be controlled to open for effecting inflation and/or deflation.

The conventional air valve, although featuring automatic sealing after inflation, still faces certain disadvantages in practical applications. For example, after a deflation operation has been conducted and completed, a certain amount of air still maintains inside the deflated object, making it not possible to further minimize the volume, which is adverse to packaging, storage, and carrying of the object. If forcible compression is employed to further reduce the volume of the deflated object, due to the internal pressure raises beyond the external pressure, the air valve is automatically set in a sealing condition, which prevents the air from being smoothly expelled outward. The only solution is to manually open the valve and this forces a single individual who is attempting to compress the air out of the object to use one of his or her hands to operate the valve, making it difficult to carry out compression of the object.

SUMMARY OF THE INVENTION

Thus, the present invention is aimed to provide a novel air valve device that alleviates or overcomes the problems of conventional devices.

In other words, the present invention provides an air valve device, which, as a whole, is comprised of a cap, an insert, a slidable rod, and a main body. Rotating to move the cap to different positions with respect to the main body sets the insert and the slidable rod at different positions inside the main body to realize an air-tight sealing condition, a deflation-allowed and inflation-prohibited condition, and an inflation-allowed and deflation-prohibited condition of the air valve device. As such, easy and convenient operation of inflation and deflation can be performed with the air valve device of the present invention.

To achieve the above objective, the present invention provides an air valve device, which, as a whole, comprises a cap, an insert, a slidable rod, and a main body.

The cap has an inner circumferential surface in which a first inner threading section, a second inner threading section, and an inner flange are formed.

The insert has an outer surface forming an outer flange and an interior central bore in which a partition board is formed. The partition board forms a rod hole and a plurality of air passage openings distributed around the rod hole. A front lid, which forms air passage openings, is received in a receiving slot defined in an open end of the insert.

The slidable rod has a rod body on which a front stop, an intermediate stop, and a rear stop.

The main body has an outer surface forming a first outer threading section, a second outer threading section, and a stop rim. The main body forms an interior bore in which a partition board forming a rod hole and air passage openings is arranged to divide the interior bore into a front chamber and a rear chamber. A rear lid, which forms air passage openings, is received in a receiving slot defined in an open end of the rear chamber.

To assemble, the insert is put in the front chamber of the main body and the slidable rod extends through the rod hole of the insert and the rod hole of the main body with the front stop of the front stop located frontward of the partition board inside the insert, the intermediate stop of the slidable rod located between the partition board of the insert and the partition board of the main body, and the rear stop of the slidable rod located in the rear chamber of the main body.

The cap can be rotated to move to different locations with respect to the main body with the first inner threading section and the second inner threading section of the cap respectively set to correspond to the first outer threading section and the second outer threading section of the main body. Thus, rotating to move the cap to different locations with respect to the main body makes the intermediate stop or the rear stop of the slidable rod respectively engaging or disengaging the partition board of the main body to respectively realize an air-tight sealing condition, a deflation-allowed and inflation-prohibited condition, and an inflation-allowed and deflation prohibited condition of the air valve device.

In accordance with the present invention, with the cap being rotated and moved to different locations of the main body, the following functions can be realized:

(1) Air-tight sealing: when a bladder type inflatable object to which the air valve device is mounted has been inflated to a desired extent of saturation, the cap is rotated and tightened to cause the intermediate stop of the main body to engage and abut the partition board inside the main body so as to seal air inside the inflatable object. Thus, air-tight sealing is realized. This is illustrated in FIG. 4 of the attached drawings.

(2) One-way deflation: the cap is rotated to loosen and disengage from the two threading sections and the intermediate stop of the slidable rod is separated from the partition board of the main body, whereby compressing the inflatable object for deflation causes air to smoothly flow outwards, as shown in FIG. 5; and whereby when compressing the inflatable object is caused to stop, due to the internal pressure of the inflatable object being less than the external pressure, the intermediate stop of the slidable rod is once again caused to engage and abut the partition board of the main body to prevent external air from entering the inflatable object, as shown in FIG. 6. Thus, expelling air for deflation in a one-way manner is realized. This feature allows the inflatable object to be compressed to the minimum volume.

(3) One-way inflation: the cap is rotated to move to the outermost position with respect to the main body to cause the intermediate stop of the slidable rod to separate from the partition board of the main body and making it impossible for them to re-engage each other, while the rear stop of the slidable rod is set in a condition of engaging or not engaging the partition board of the main body so that, under such a condition, the inflatable object can be inflated by filling air therein, as shown in FIG. 7, until the inflatable object 60 gets saturated. In the course of inflation, when the inflation operation is stopped, due to the internal pressure of the inflatable object exceeding the external pressure, the rear stop of the slidable rod is forced to engage the partition board of the main body, thereby preventing air from being expelled, as shown in FIG. 8. Thus, inflation or air charging in a one-way manner is realized. This feature allows the inflatable object to be easily charged with air and thus inflated.

The inflatable object mentioned above can be for example an inflatable mattress, an inflatable toy, or any air bladder that is inflatable by charging air therein.

BRIEF DESCRIPTION OF THE DRAWINGS

The present invention will be apparent to those skilled in the art by reading the following description of a preferred embodiment thereof, with reference to the attached drawings, wherein:

FIG. 9 illustrates an application of the air valve device of the present invention mounted to an inflatable object.

DETAILED DESCRIPTION OF THE PREFERRED EMBODIMENT

Figure 1:
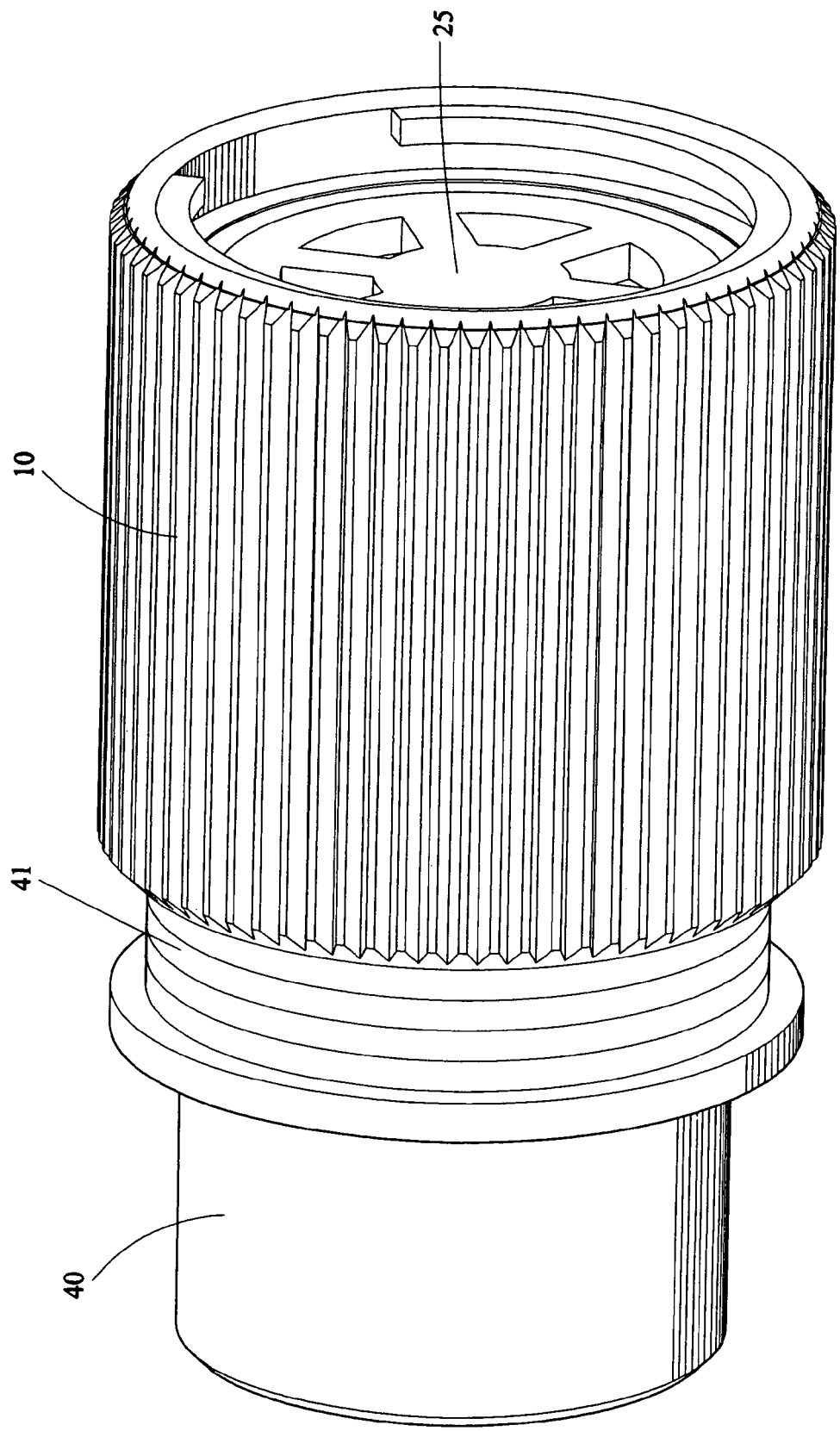
FIG. 1 is a perspective view, in an assembled form, of an air valve device constructed in accordance with an embodiment of the present invention.
Figure 2:
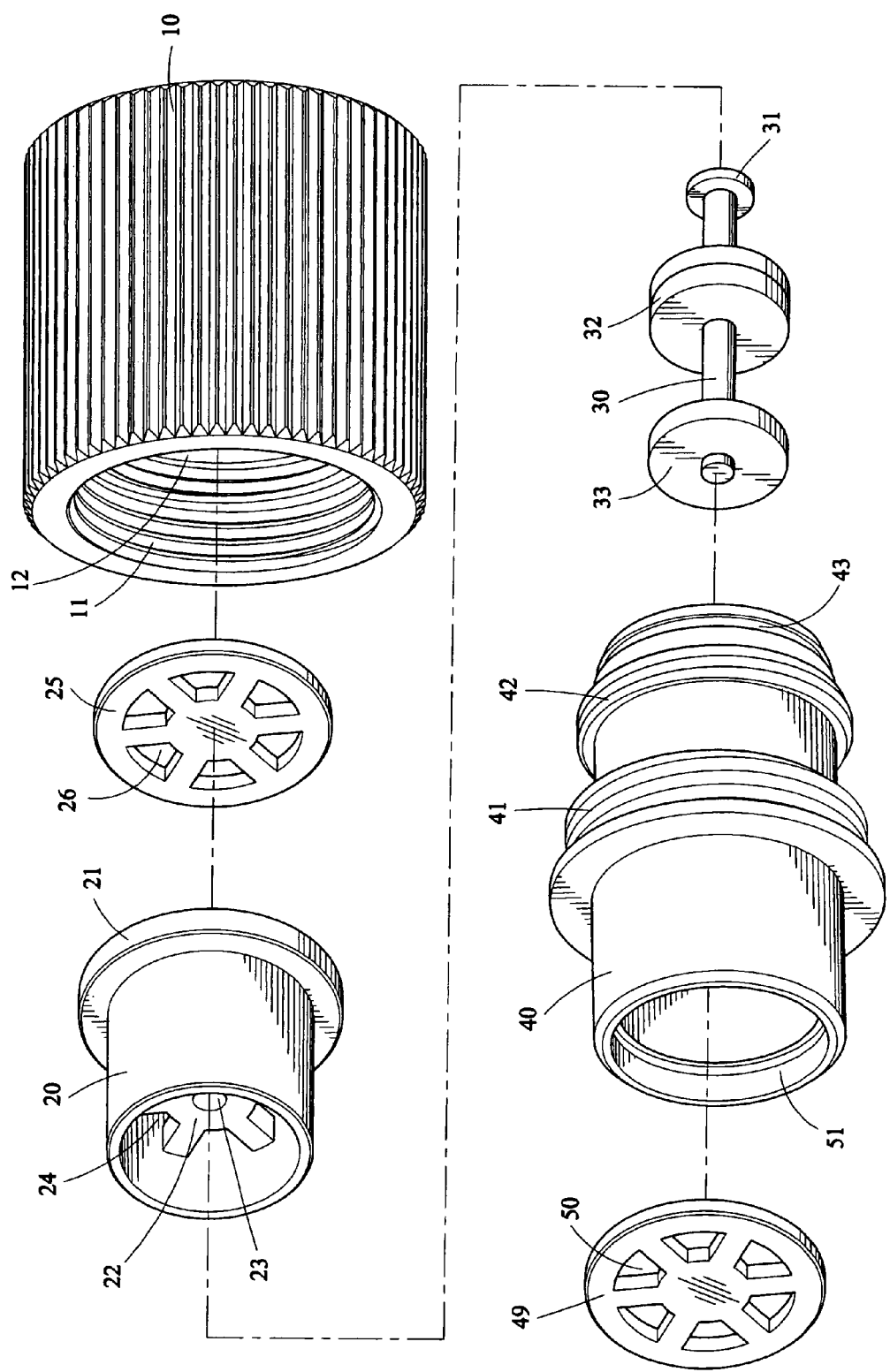
FIG. 2 a perspective view, in an exploded form, of the air valve device of FIG. 1.
Figure 3:
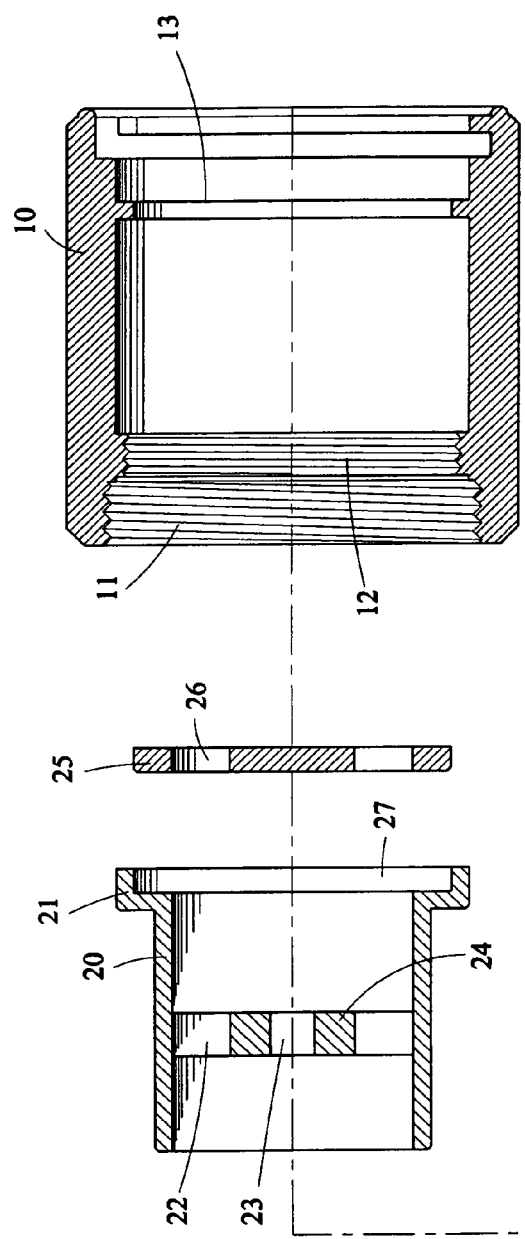
FIG. 3 a cross-sectional view, in an exploded form, of the air valve device of FIG. 2.
Figure 3:
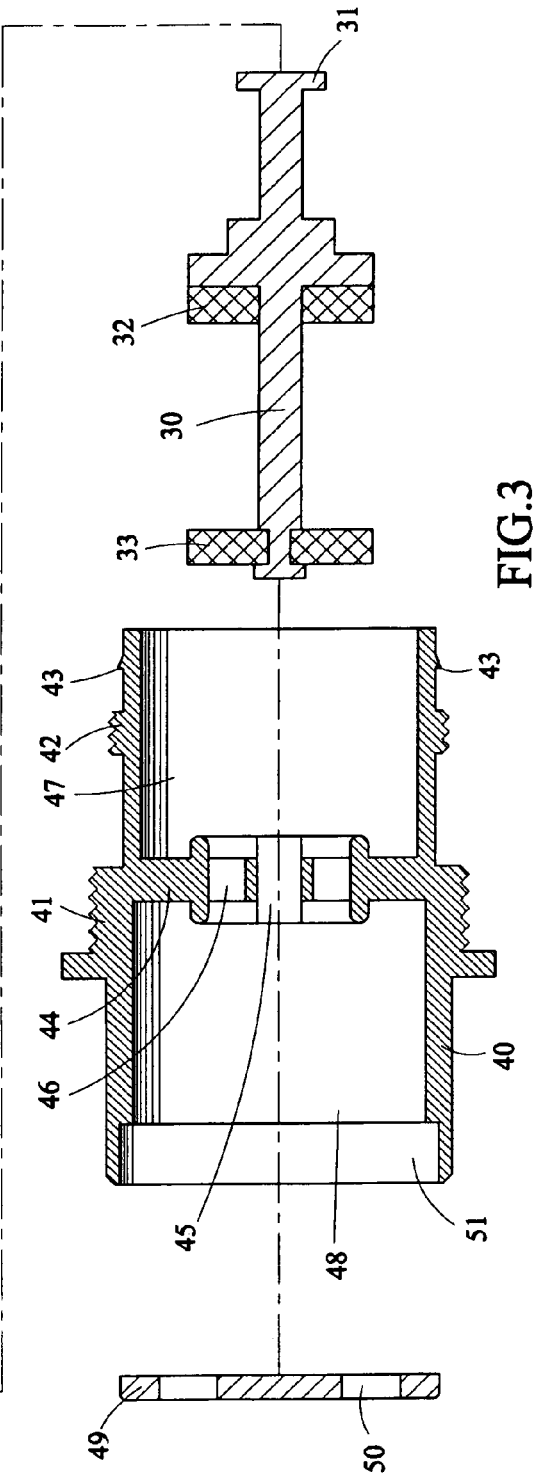

With reference to the drawings and in particular to FIGS. 1-3, which respectively show a perspective view, in an assembled form, of an air valve device constructed in accordance with an embodiment of the present invention, a perspective view, in an exploded form, of the air valve device of FIG. 1, and a cross-sectional view, in an exploded form, of the air valve device of FIG. 2, as shown in FIGS. 1 and 2, the air valve device of the present invention, as a whole, comprises a cap 10, an insert 20, a slidable rod 30, and a main body 40.

As shown in FIGS. 2 and 3, the cap 10 has an inner circumferential surface in which a first inner threading section 11, a second inner threading section 12, and an inner flange 13 are formed.

The insert 20 comprises an outer flange 21 formed on an outer surface of the insert 20. The insert 20 has an interior central bore in which a partition board 22 is formed. The partition board 22 forms a rod hole 23 and a plurality of air passage openings 24 distributed around the rod hole 23. A front lid 25, which forms air passage openings 26, is fit in a receiving slot 27 defined in an open end of the insert 20.

The slidable rod 30 forms a front stop 31 in a front end section, an intermediate stop 32 in a middle section, and a rear stop 33 in a rear end section.

The main body 40 has an outer surface forming a first outer threading section 41, a second outer threading section 42, and a stop rim 43. The main body 40 forms an interior bore in which a partition board 44 forming a rod hole 45 and air passage openings 46 is arranged to divide the interior bore into a front chamber 47 and a rear chamber 48. A rear lid 49, which forms air passage openings 50, is received in a receiving slot 51 defined in an open end of the rear chamber 48.

To assemble the above described elements, the insert 20 is put in the front chamber 47 of the main body 40 with the outer flange 21 of the insert 20 located frontward of the inner flange 13 of the cap 10. The slidable rod 30 extends through the rod hole 23 of the insert 20 and the rod hole 45 of the main body 40 with the front stop 31 of the front stop 31 located frontward of the partition board 22 inside the interior bore of the insert 20, the intermediate stop 32 of the slidable rod 30 located between the partition board 22 of the insert 20 and the partition board 44 of the main body 40, and the rear stop 33 of the slidable rod 30 located in the rear chamber 48 of the main body 40.

Figure 4:
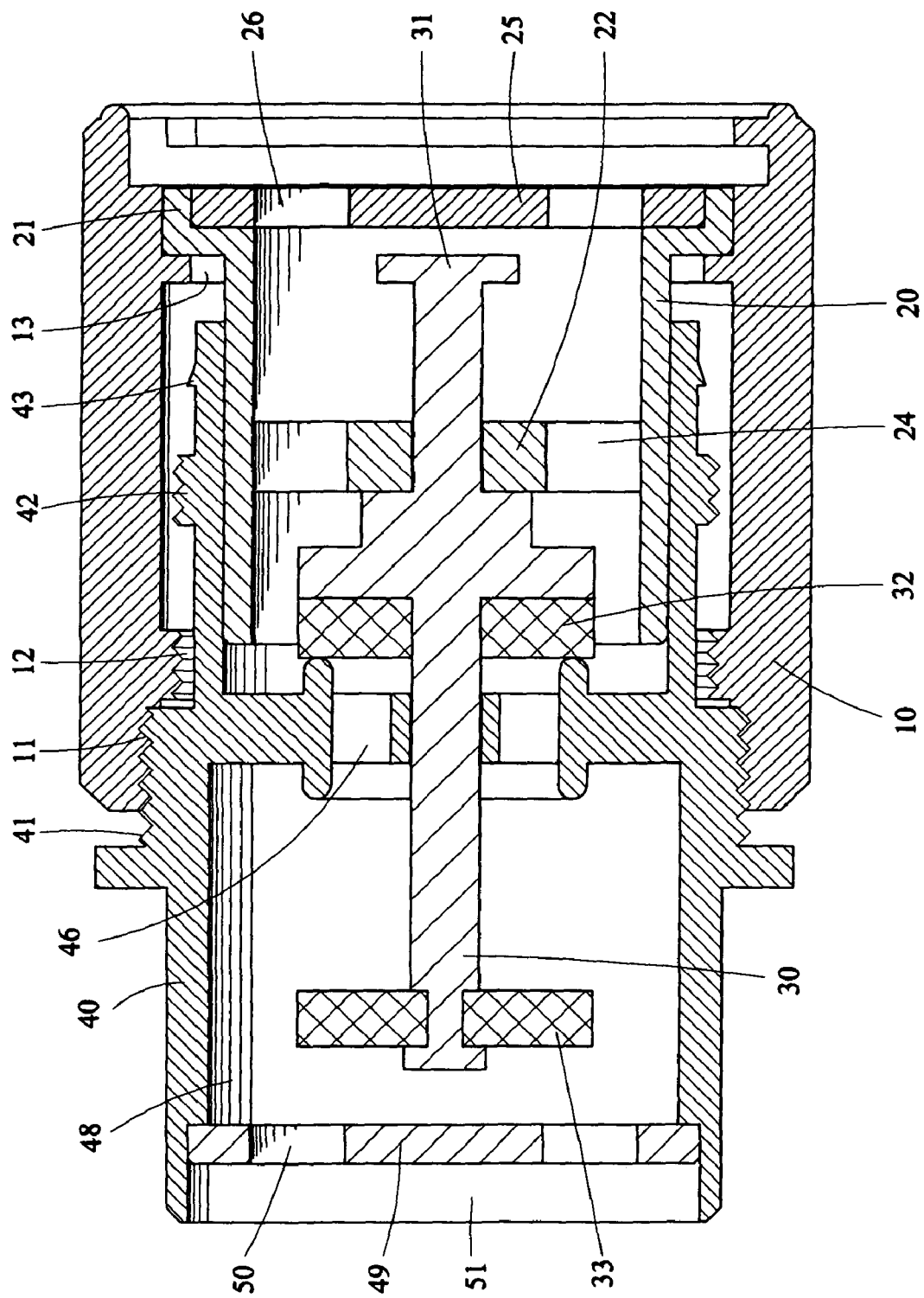
FIG. 4 a cross-sectional view of the assembled air valve device in accordance with the present invention, illustrating an air-tight sealing condition of the air valve device.
Figure 5:
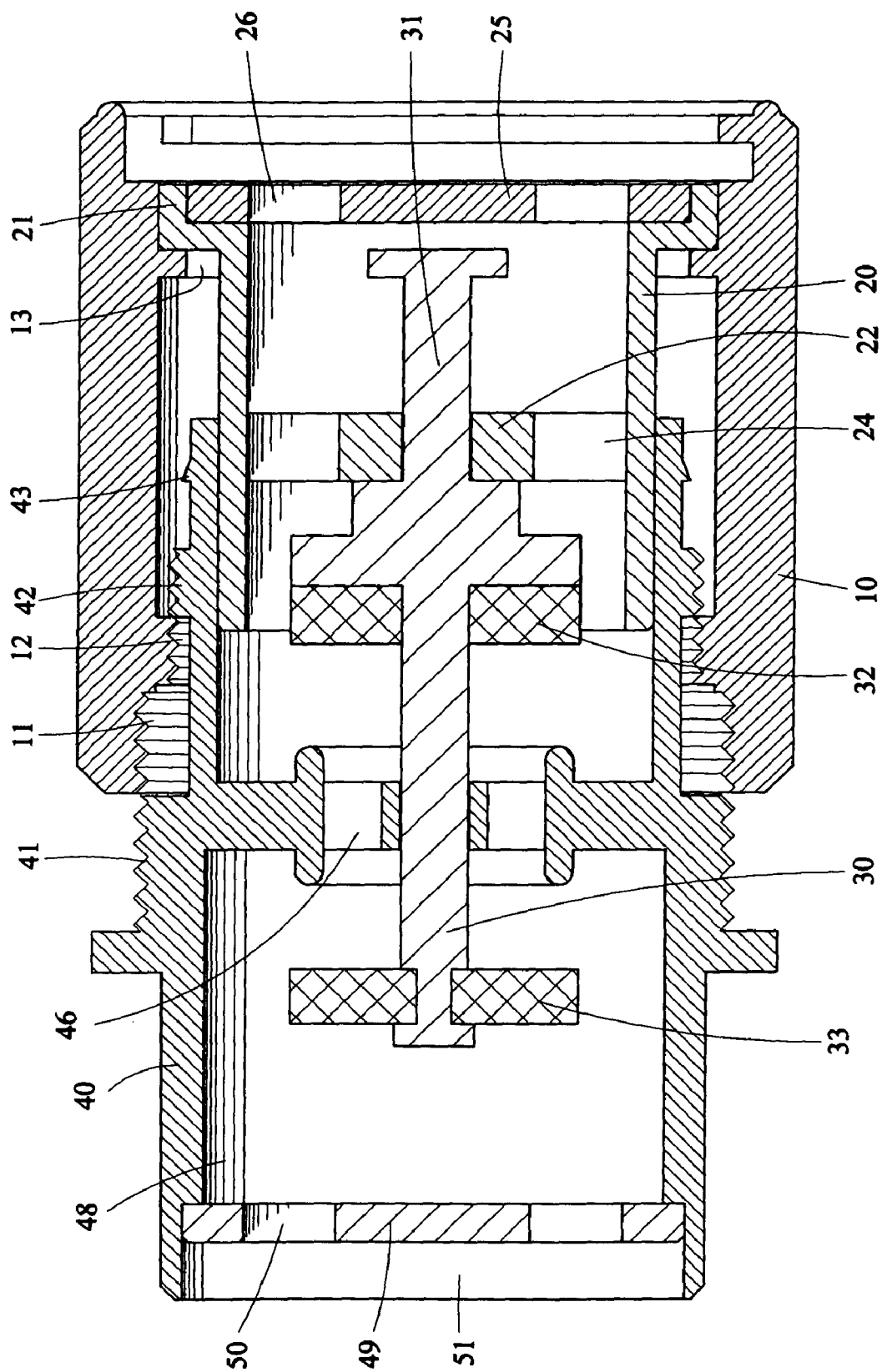
FIG. 5 is a cross-sectional view of the assembled air valve device in accordance with the present invention, illustrating a deflation-allowed and inflation-prohibited condition of the air valve device.
Figure 6:
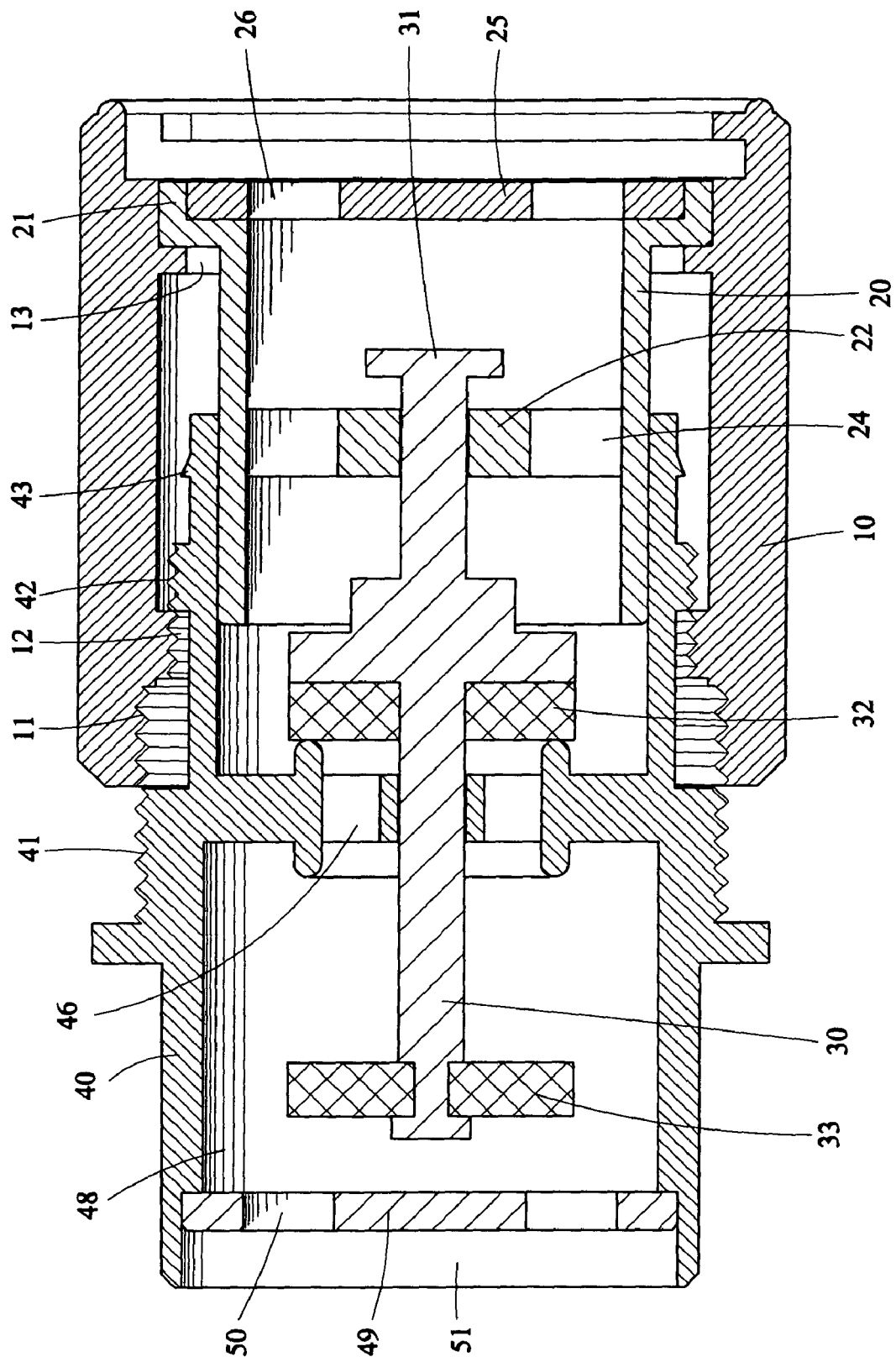
FIG. 6 is a cross-sectional view illustrating a deflation-allowed and inflation-prohibited condition as a state subsequent to that of FIG. 5.
Figure 7:
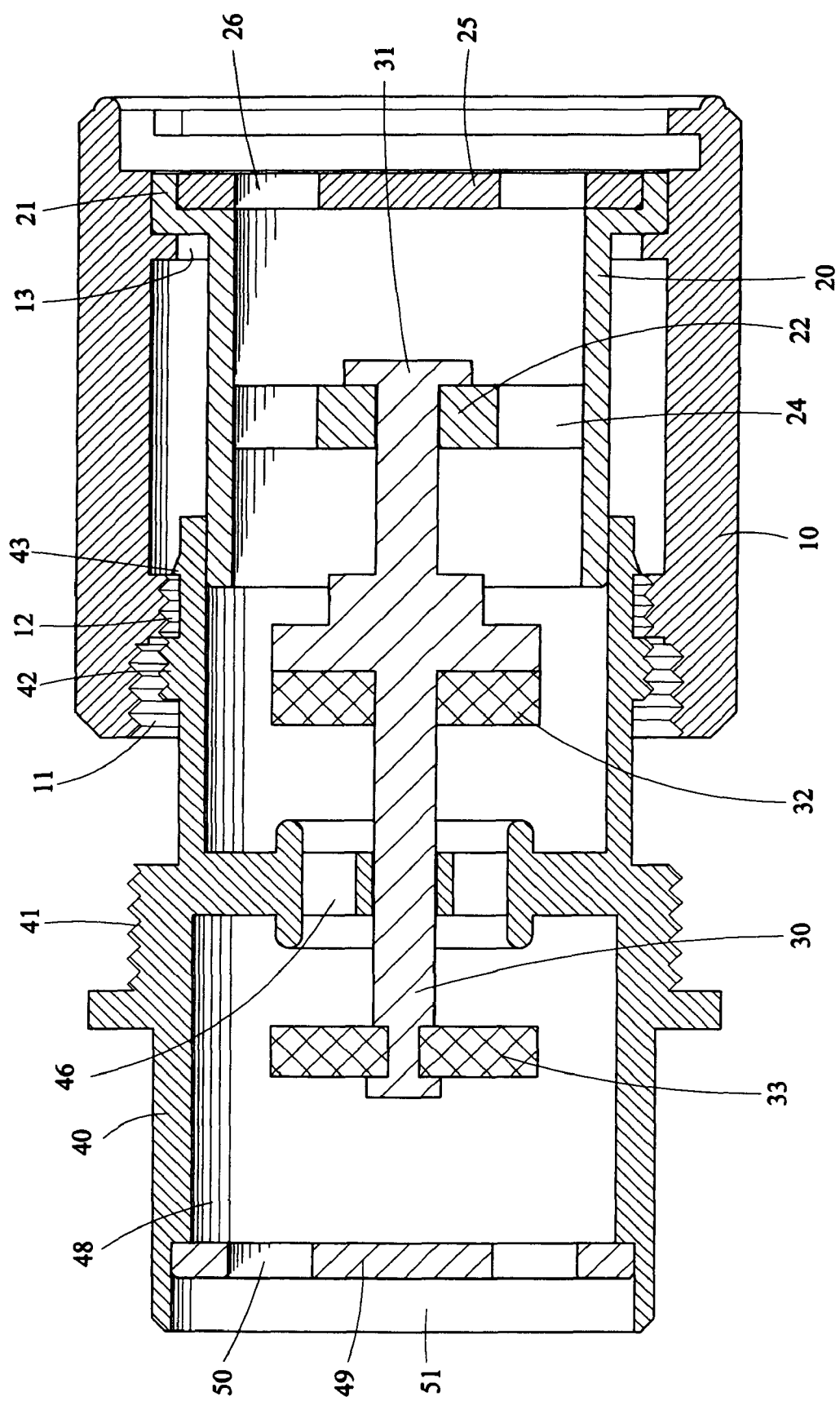
FIG. 7 is a cross-sectional view of the assembled air valve device in accordance with the present invention, illustrating an inflation-allowed and deflation-prohibited condition of the air valve device.
Figure 8:
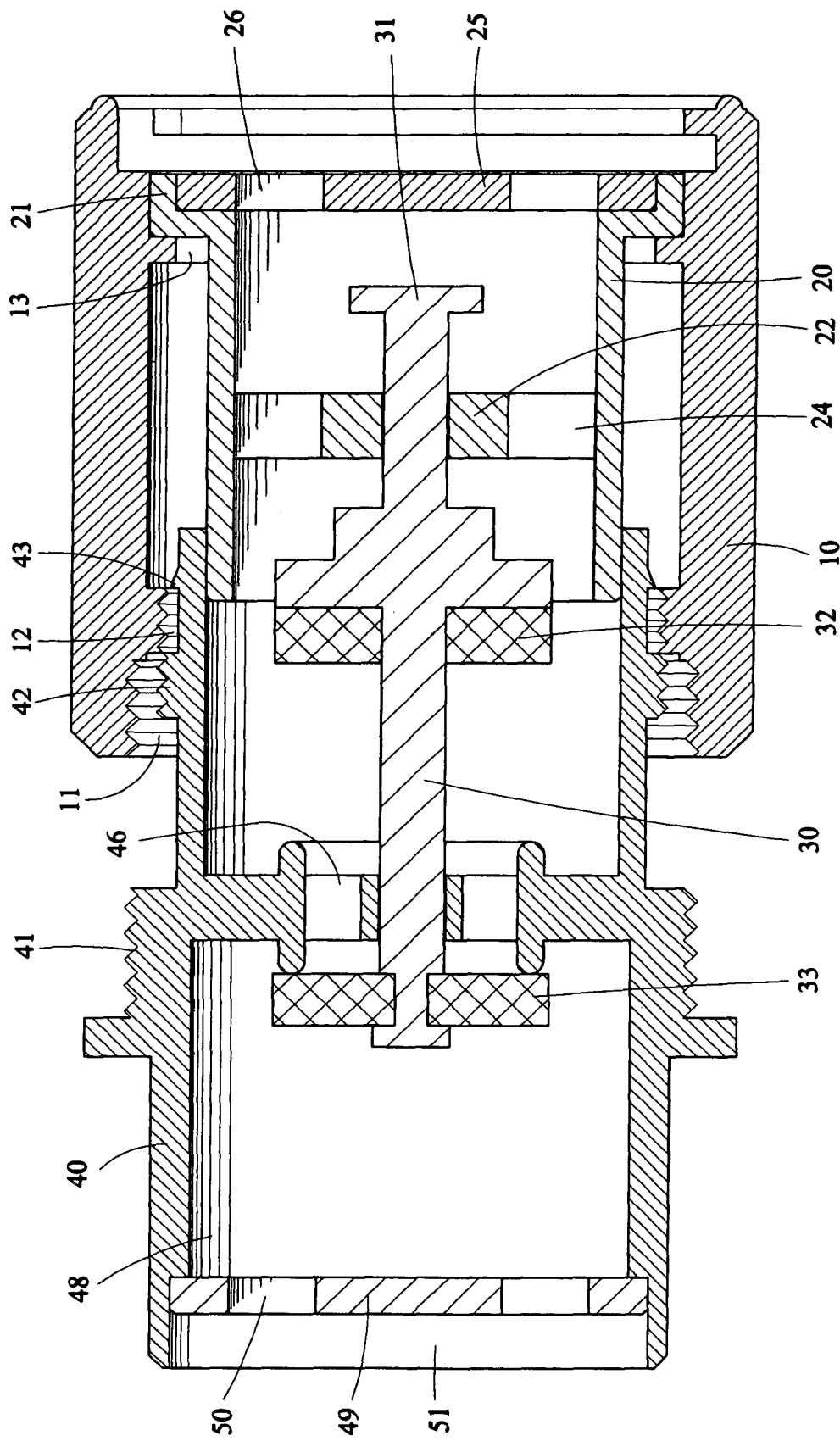
FIG. 8 is a cross-sectional view illustrating an inflation-allowed and deflation-prohibited condition as a state subsequent to that of FIG. 7.

FIG. 4 is a cross-sectional view of the assembled air valve device in accordance with the present invention, illustrating an air-tight sealing condition. FIG. 5 is a cross-sectional view of the assembled air valve device in accordance with the present invention, illustrating a deflation-allowed and inflation-prohibited condition. FIG. 6 is a cross-sectional view illustrating a deflation-allowed and inflation-prohibited condition as a state subsequent to that of FIG. 5. FIG. 7 is a cross-sectional view of the assembled air valve device in accordance with the present invention, illustrating an inflation-allowed and deflation-prohibited condition. FIG. 8 is a cross-sectional view illustrating an inflation-allowed and deflation-prohibited condition as a state subsequent to that of FIG. 7. FIG. 9 illustrates an application of the air valve device of the present invention to an inflatable object 60.

As shown in FIGS. 4-8, by rotating the cap 10 to move the cap 10 to different axial location with respect to the main body 40, the first inner threading section 11 and the second inner threading section 12 of the cap 10 can be respectively set to correspond to the first outer threading section 41 and the second outer threading section 42 of the main body 40, thereby making the intermediate stop 32 or the rear stop 33 of the slidable rod 30 respectively engaging or disengaging the partition board 44 of the main body 40 for closing or opening the air passage openings 46 of the partition board 44, allowing the air valve device to respectively realize an air-tight sealing condition, a deflation-allowed and inflation-prohibited condition, and an inflation-allowed and deflation prohibited condition.

As shown in FIG. 4, when the inflatable object 60 has been inflated to a desired extent of saturation, the cap 10 is rotated and tightened to cause the intermediate stop 32 of the main body 40 to engage and abut the partition board 44 inside the main body 40, whereby air is sealed inside the inflatable object 60. Thus, air-tight sealing is realized.

As shown in FIGS. 5 and 6, to deflate the inflatable object 60, the cap 10 is rotated to disengage from the two threading sections and the intermediate stop 32 of the slidable rod 30 is separated from the partition board 44 of the main body 40. At this time, by squeezing or compressing the inflatable object 60, air is allowed to smoothly flow outwards, as shown in FIG. 5. When the squeezing or compressing operation of the inflatable object 60 stops, due to the internal pressure of the inflatable object 60 being less than the external pressure, the intermediate stop 32 of the slidable rod 30 is caused to engage and abut the partition board 44 of the main body 40 to prevent external air from entering the inflatable object 60, as shown in FIG. 6, whereby expelling air in a one-way manner is realized. This feature allows the inflatable object to be compressed to the minimum volume to facilitate packaging, storage and carrying.

As shown in FIGS. 7 and 8, to carry out inflation operation of the inflatable object 60, the cap 10 is rotated to move to the outermost position with respect to the main body 40, at which the stop rim 43 of the main body 40 engages an outer side of the second inner threading section 12 of the cap 10 to prevent the cap 10 from undesired separation. At the same time, the inner flange 13 of the cap 10 drives the insert 20 and the front stop 31 of the slidable rod 30 outward in the frontward direction, causing the intermediate stop 32 of the slidable rod 30 to separate from the partition board 44 of the main body 40 and making it impossible for them to re-engage each other. The rear stop 33 of the slidable rod 30 is set in a condition of engaging or not engaging the partition board 44 of the main body 40. Under this condition, the inflatable object 60 can be inflated by filling air therein, as shown in FIG. 7, until the inflatable object 60 gets saturated.

In the course of inflation, when the inflation operation is stopped, due to the internal pressure of the inflatable object 60 exceeding the external pressure, the rear stop 33 of the slidable rod 30 is forced to engage the partition board 44 of the main body 40, thereby preventing air from being expelled, as shown in FIG. 8. Thus, inflation or air charging in a one-way manner is realized. This feature allows the inflatable object to be easily charged with air and thus inflated.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An air valve device adapted to mount to an inflatable article, comprising:
   a cap having an inner circumferential surface in which a first inner threading section, a second inner threading section, and an inner flange are formed;
   an insert having an outer surface forming an outer flange and an interior space in which a partition board is formed, the partition board forming a rod hole and a plurality of air passage openings distributed around the rod hole, a front lid forming air passage openings and received in a receiving slot defined in an open end of the insert;
   a slidable rod forming a front stop in a front end section, an intermediate stop in a middle section, and a rear stop in a rear end section;
   a main body having an outer surface forming a first outer threading section, a second outer threading section, and a stop rim and an interior space in which a partition board forming a rod hole and air passage openings is arranged to divide the interior space of the main body into a front chamber and a rear chamber, a rear lid forming air passage openings and received in a receiving slot defined in an open end of the rear chamber;
   wherein the insert is arranged in the front chamber of the main body with the outer flange of the insert located frontward of the inner flange of the cap, and the slidable rod extends through the rod hole of the insert and the rod hole of the main body with the front stop of the front stop located frontward of the partition board inside the interior space of the insert, the intermediate stop of the slidable rod located between the partition board of the insert and the partition board of the main body, and the rear stop of the slidable rod located in the rear chamber of the main body; and
   wherein by rotating to move the cap to different axial locations with respect to the main body, the intermediate stop or the rear stop of the slidable rod is made to engage or disengage from the partition board of the main body for selectively closing or opening the air passage openings of the partition board to respectively realize an air-tight sealing condition, a deflation-allowed and inflation-prohibited condition, and an inflation-allowed and deflation prohibited condition.

2. The air valve device as claimed in claim 1, wherein when the inflatable article has been inflated to a desired extent of saturation, the cap is rotated and tightened to cause the intermediate stop of the main body to engage and abut the partition board inside the main body, whereby air is sealed inside the inflatable article and air-tight sealing is realized.

3. The air valve device as claimed in claim 1, wherein the cap is rotatable to disengage from the two threading sections and the intermediate stop of the slidable rod is separated from the partition board of the main body, whereby squeezing the inflatable article forces air to smoothly flow outwards and whereby when squeezing the inflatable article is caused to stop, due to internal pressure of the inflatable article being less than external pressure, the intermediate stop of the slidable rod is caused to engage and abut the partition board of the main body to prevent external air from entering the inflatable article and expelling air in a one-way manner is realized.

4. The air valve device as claimed in claim 1, wherein the cap is rotatable to move to an outermost position with respect to the main body, at which the stop rim of the main body engages an outer side of the second inner threading section of the cap to prevent the cap from undesired separation and wherein the inner flange of the cap drives the insert and the front stop of the slidable rod frontward, causing the intermediate stop of the slidable rod to separate from the partition board of the main body and making it impossible for them to re-engage each, other, the rear stop of the slidable rod being set in a condition of selectively engaging or not engaging the partition board of the main body, whereby the inflatable article is inflated and wherein in the course of inflation, when the inflation operation is stopped, due to internal pressure of the inflatable article exceeding external pressure, the rear stop of the slidable rod is forced to engage the partition board of the main body, thereby preventing air from being expelled and inflation or air charging in a one-way manner is realized.

5. The air valve device as claimed in claim 1, wherein the inflatable article comprises an inflatable mattress.

6. The air valve device as claimed in claim 1, wherein the inflatable article comprises an inflatable toy.

7. The air valve device as claimed in claim 1, wherein the inflatable article comprises an inflatable bladder.

* * * * *